United States Patent [19]

Conner

[11] Patent Number: 4,845,418
[45] Date of Patent: Jul. 4, 1989

[54] FLUX PROFILE CONTROL FOR STARTUP OF AN INDUCTION MOTOR

[75] Inventor: Craig R. Conner, Greenfield, Wis.

[73] Assignee: Allen-Bradley Company, Inc., Milwaukee, Wis.

[21] Appl. No.: 185,239

[22] Filed: Apr. 18, 1988

Related U.S. Application Data

[63] Continuation of Ser. No. 900,883, Aug. 27, 1986, abandoned.

[51] Int. Cl.⁴ ............................................. H02P 1/26
[52] U.S. Cl. ................................... 318/778; 318/436; 318/808
[58] Field of Search .............. 318/778, 436, 430, 431, 318/803, 807–811, 779

[56] References Cited

U.S. PATENT DOCUMENTS

| | | | |
|---|---|---|---|
| 3,427,526 | 2/1969 | Kernick | 318/778 |
| 3,870,945 | 3/1975 | Pedersen et al. | 318/807 |
| 4,259,845 | 4/1981 | Norbeck | 318/808 |
| 4,263,542 | 4/1981 | Schulze et al. | |
| 4,302,713 | 11/1981 | Cutler | 318/436 |
| 4,311,951 | 1/1982 | Walker et al. | 318/778 |
| 4,456,868 | 6/1984 | Yamamura et al. | 318/800 |
| 4,465,961 | 8/1984 | Landing | 318/810 |
| 4,470,001 | 9/1984 | Resch et al. | 318/778 |
| 4,503,376 | 3/1985 | Okuyama | 318/805 |
| 4,506,321 | 3/1985 | Comstock et al. | |
| 4,620,272 | 10/1986 | Fulton et al. | |

OTHER PUBLICATIONS

Gabriel, et al., "Field–Oriented Control of a Standard AC Motor Using Microprocessors", *Adjustable Speed AC Drive Systems* IEEE Press, 1980.
Bulletin 1392 High Performance AC Drive System, Allen–Bradley, Mar., 1986.

*Primary Examiner*—David Smith, Jr.
*Attorney, Agent, or Firm*—Quarles & Brady

[57] ABSTRACT

A method of controlling current in an AC motor to inhibit small torques on an unloaded motor output shaft and to improve buildup of steady-state operating flux in a rotor includes supplying current to the stator windings through a plurality of semiconductor switches, operating the semiconductor switches to supply a plurality of gradually increasing currents to the stator windings over a time interval corresponding to approximately one rotor time constant to bring flux in the rotor up to approximately 10% of a steady-state operating flux in the rotor, operating the semiconductor switches to supply a current that is the maximum current rated for pulsed operation of the semiconductor switches for a time interval over which a product of current and time is sufficient to produce steady-state operating flux in the rotor, and then reducing the stator current to a level for maintaining steady-state operating flux in the rotor. A microelectronic apparatus for carrying out the method is also disclosed.

14 Claims, 11 Drawing Sheets

FLUX PROFILE CONTROL FOR STARTUP OF AN INDUCTION MOTOR

This application is a continuation of application Ser. No. 900,883, filed Aug. 27, 1986, now abandoned.

BACKGROUND OF THE INVENTION

The invention generally relates to motor control systems for controlling the operation of three-phase AC motors.

The invention more particularly relates to industrial applications of AC motors where quick response and a broad range of speed control are desired. One such application for AC motors is drive systems for elevators. Each time an elevator is stopped, the driving motor must be braked to a stop and then restarted to move the elevator to the next floor.

To develop torque in the motor driving the elevator, magnetic flux must be established in the rotor, the rotating element of the motor. To develop flux, current is supplied to the windings on the stator, which is the stationary portion of the motor formed around the rotor and separated from the rotor by an air gap. Flux is not established instantaneously but instead builds up over time as an exponential function of current. This time is related to a rotor time constant, which is the ratio ($L_R/R_R$) of rotor inductance $L_R$ to rotor resistance $R_R$ and the flux build-up time will be extended for a motor having a relatively higher time constant.

A prior method for starting an elevator drive motor included supplying the current that was required to maintain steady-state operating flux in the rotor. When this current was provided on startup, however, the response of the motor was not fast enough to provide suitable performance as an elevator drive.

A technical problem during startup of the motor control system in another application involved undesired movements of a rotor shaft due to small transient torques produced in the motor. It is believed that these small torques may be due to residual magnetism and hysteresis effects, or they may be due to the variation in the magnetic reluctance due to the configuration of slots in the stator or rotor. These small torques produced undesired movement of the rotor output shaft when the motor was not mechanically loaded.

A typical three-phased AC motor control system includes a power circuit and a control circuit. The power circuit usually includes an AC-to-DC converter, an intermediate DC circuit and an inverter for reconverting DC power to alternating currents that are supplied to the stator of the motor. The inverter includes a network of six semiconductor switches, which may be thyristors or power transistors. The currents that are supplied to the stator may be precisely controlled by controlling the firing or conduction of the semiconductor switches with one of several known control circuits. One type of control circuit uses pulse width modulation (PWM) to control the operation of the semiconductor switches.

SUMMARY OF THE INVENTION

The invention involves a method and a control circuit for controlling the starting current and the resultant buildup of flux in the rotor to overcome the problems discussed above.

To sole the first problem, in the case where initially flux is not established in the rotor, higher than normal flux-producing current is supplied to the stator over a time interval in which the product of current and time (amp-seconds) is sufficient to produce a level of operating flux equal to a steady-state operating flux. This current is limited only by the maximum current rating for pulsed operation of the semiconductor switches in the three-phase current inverter. In the one detailed example discussed herein, this rating is 150 amps per phase. This current may be greater than the steady-state full load current of the motor, as long as its duration is short enough to prevent undue heating in the motor. For example, after an interval of one time constant (150 milliseconds), the flux producing current supplied to the stator is reduced to the current that would normally be supplied to establish and maintain a steady-state operating flux in the rotor.

This technique is enhanced in certain motor control systems known as vector control or field-oriented motor drives, it is possible to resolve the total three-phase current into a flux-producing component and a torque-producing component. This technique of the invention is enhanced by commanding the torque-producing component to zero during application of the maximum current. This technique is also enhanced in motor control systems where the commanded slip angle can be held to zero during application of the maximum current.

One object of the invention is to reduce the time over which sufficient flux will be established to develop the torque required to restart an AC motor used as an elevator drive.

The second problem of undesired shaft movements can be prevented by controlling the firing or conduction of the semiconductor switches to apply a sequence of small but increasing currents to the stator. The magnitude of the currents is selected to develop approximately 10% of the steady-state operating flux by the end of this first 150-millisecond period. This produces a rotor flux that is in phase with the stator flux and the resultant rotor flux phase tends to become aligned with the stator flux phase before any appreciable torque is produced. Then, a further ramp function or a step function of current for producing steady-state flux may be applied without causing abrupt transient movements of the motor drive shaft.

It is a third aspect of the invention that the above two startup techniques may be combined in a single startup sequence. The two techniques tend to complement each other in that the first technique shortens startup time, but may aggravate the problem of transient torques, while the second technique inhibits transient torques but increases startup time.

These and other objects and advantages of the invention will be apparent from the following description, in which reference is made to the accompanying drawings, which form a part hereof, and in which there is shown by way of example a preferred embodiment of the invention. This example does not necessarily represent the full scope of the invention, however, and reference is therefore made to the claims for determining the various embodiments within the scope of the invention.

DETAILED DESCRIPTION OF THE PREFERRED EMBODIMENT

The present invention relates to industrial applications of AC motors where quick response and a broad range of speed control are desired. One such application for AC motors is drive systems for elevators. Each time an elevator is stopped, the driving motor must be braked to a stop and then restarted to move the elevator to the next floor.

To develop torque in the motor driving the elevator, magnetic flux must be established in the rotor, the rotating element of the motor. To develop flux, current is supplied to the windings on the stator, which is the stationary portion of the motor formed around the rotor and separated from the rotor by an air gap. Flux is not established instantaneously but instead builds up over time as an exponential function of current. This time is related to a rotor time constant, which is the ratio ($L_R/R_R$) of rotor inductance $L_R$ to rotor resistance $R_R$ and the flux buildup time will be extended for a motor having a relatively higher time constant. One object of the invention is to reduce both the absolute time and the number of time constants over which sufficient flux will be established to develop the torque required to restart an AC motor used as an elevator drive.

Figure 3A:
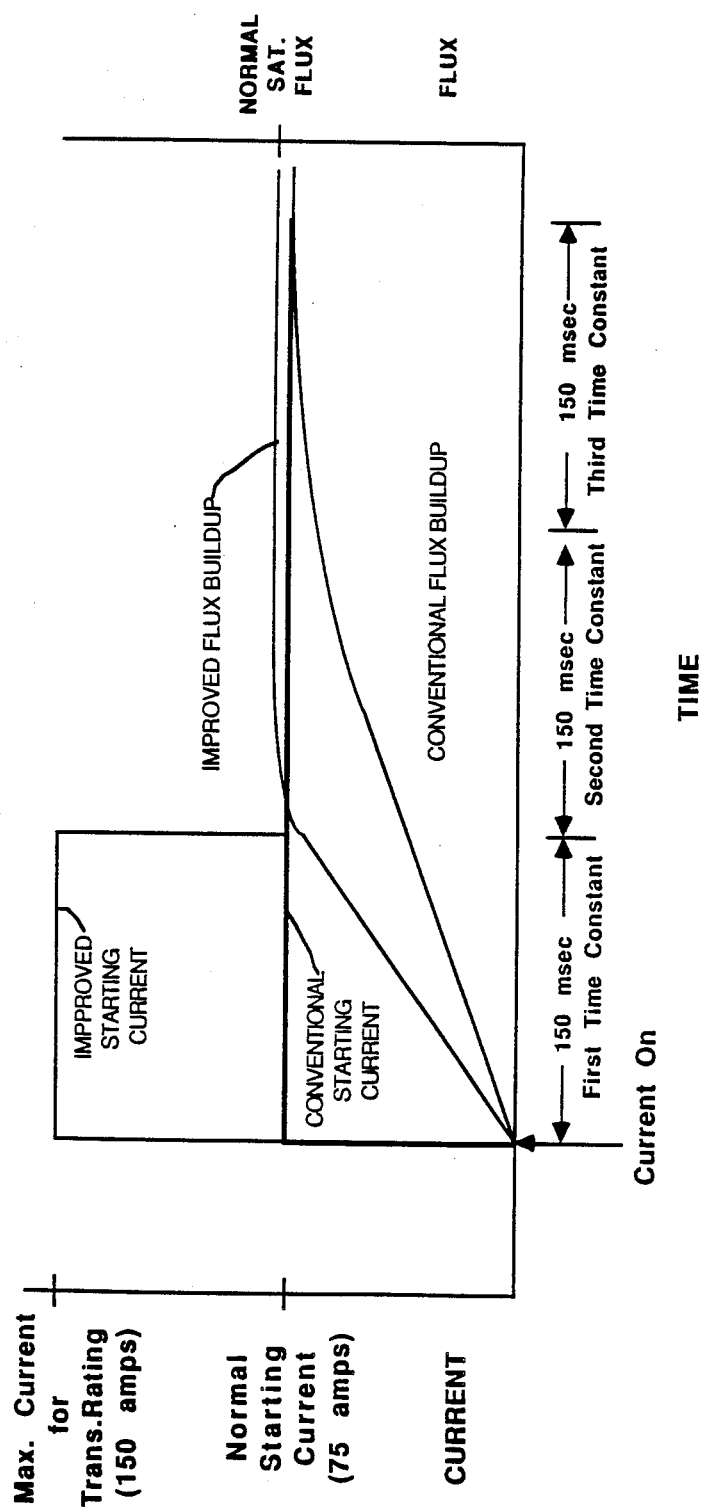
FIG. 3A is a graph of stator current and flux vs. time for a first aspect of the invention.

Referring to FIG. 3A, the heavy line shows the current profile of a conventional startup sequence for an AC motor beginning at a point where flux has not been established in the rotor. For this example it shall be assumed that the rotor time constant is 150 milliseconds, although in other examples it could be as long as 600 milliseconds. In the conventional startup the initial applied current (75 amps) is that current which will maintain normal saturated flux in the rotor. Because this flux is not established instantaneously, a time in the range of three to four time constants is observed before rotor flux reaches normal saturated flux, which is also the steady-state operating flux. This flux profile is illustrated as the "conventional" flux profile in FIG. 3A.

According to the invention, the initial applied current should be greater than the current that would maintain normal or steady-state flux in the rotor. In fact, the initial applied current should be limited only by the current rating for pulsed operation of the power semiconductors through which the current is applied to the motor. In this example, it shall be assumed that this current rating (150 amps) is twice the normal flux producing current of 75 amps. According to the invention, this higher current is applied during the first time constant of startup time, to bring the rotor flux up to its normal saturated flux level in approximately one time constant. At the end of this period (150 milliseconds), the applied current is reduced to the current which will maintain normal saturated flux in the rotor. The initial applied current is reduced after a relatively short interval, such as one time constant, to prevent undue heating in the power semiconductors or in the motor windings. The result is an "improved" current profile shown by the thinner current line and a corresponding "improved" flux profile shown in FIG. 3A.

In other embodiments, it is contemplated that the normal starting current may be less than the current for producing saturation of flux in the rotor during steady-state operation.

Referring to FIG. 3A, for example, if the normal starting current is 37.5 amps, the ratio of the improved starting current (still 150 amps) to the normal starting current of 37.5 amps is 4:1 instead of 2:1. In these circumstances, the time interval for applying the 150-amp starting current may be reduced to 75 milliseconds. It has been found that it is the product (in amp-seconds) of starting current multiplied by the starting current time interval that is related to the buildup of steady-state operating flux in starting the motor. This product is represented by the area under the step portion of the improved starting current graph.

It should further be understood that while the steady-state operating flux in the example shown in FIG. 3A has been selected as the flux at rotor saturation, in other embodiments a steady-state operating flux below this level may be selected. Rotor flux saturation, illustrated by the leveling off of the flux curve in FIG. 3A, acts as a limit on flux in the steady state and also acts as a general limit on flux produced in the motor. The invention recognizes that due to rotor saturation higher than usual starting currents may be employed without causing excessive flux in the motor.

It has also been discovered that the above improved technique is enhanced by commanding torque to zero during the 150-millisecond period in which the higher starting current is applied. Only after flux is brought up to the desired level does the motor control system command the motor to produce torque. The torque command is inhibited during the flux build-up time by commanding the torque-producing component of current $I_q$ and slip (W) to zero.

Figure 3B:
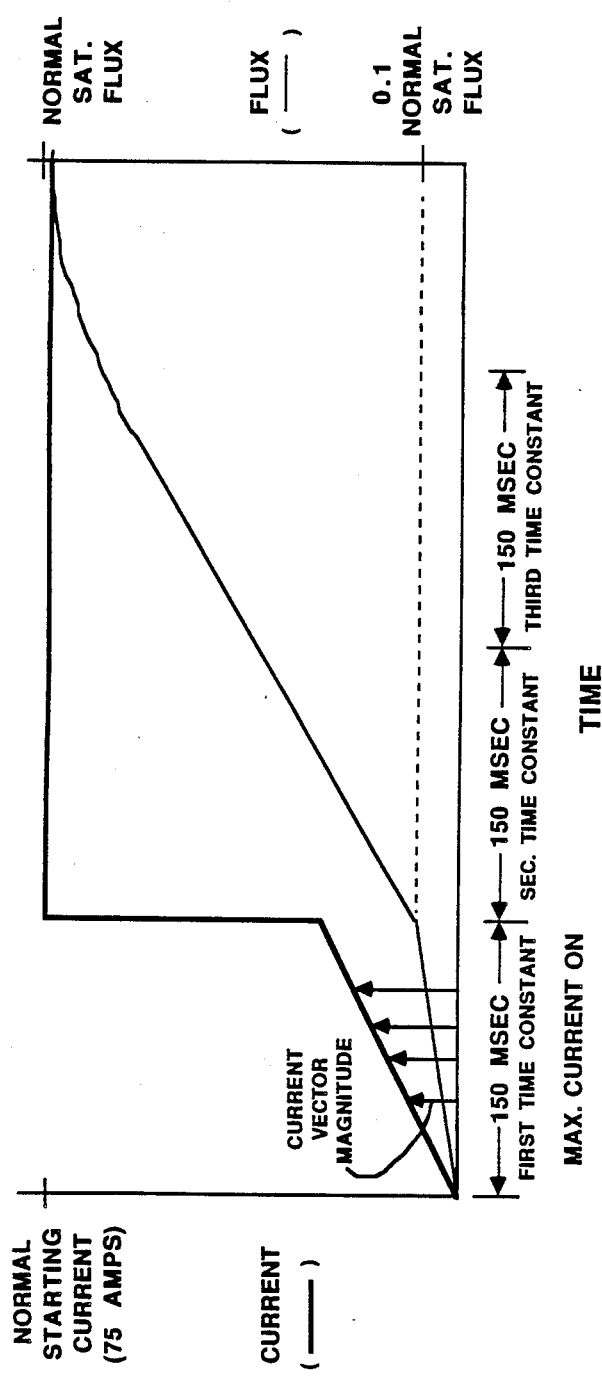
FIG. 3B is a graph of stator current and flux vs. time for a second aspect of the invention.
Figure 3C:
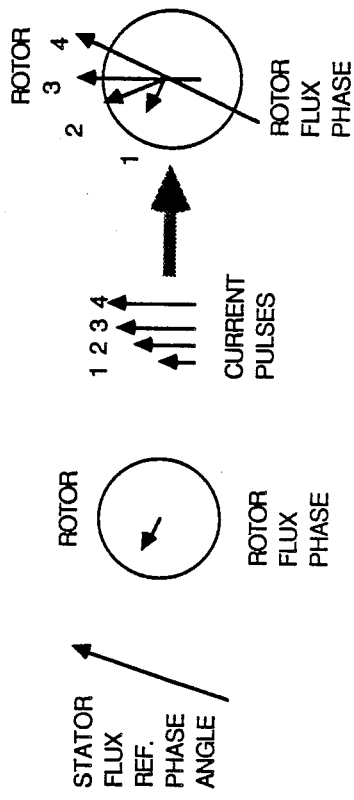
FIG. 3C is a schematic showing the effects of employing the second aspect of the invention.

A second aspect of the invention is illustrated in FIGS. 3B and 3C. When an AC induction motor is started with a step function of current as illustrated in FIG. 3A, small transient torques are exerted on the motor drive shaft. These small torques may be due to residual magnetism and hysteresis effects, or they may be due to the effects of variation in the magnetic reluctance due to the configuration of slots in the stator or rotor. These small torques may produce undesired movement of the motor shaft when it is not mechanically loaded.

From an electromagnetic viewpoint, the reason for small transient torques on startup is the existence of an initial difference in phase angle orientation between flux in the stator and the flux in the rotor as shown in FIG. 3C. If the vector representing stator flux is aligned with the vector representing rotor flux, these torques will not be produced. Torque produced in a motor can be expressed in an equation in terms of stator current ($I_s$), rotor flux ($\Phi_R$), the sine of the angle between these two vector quantities (sin $\theta_{SR}$), and some constant (k), as follows:

$$= k(I_s)(\Phi_R) \sin \theta_{SR} \quad (1)$$

According to a second aspect of the invention undesired shaft movements can be prevented by applying a sequence of small but increasing stator currents to produce a rotor flux that is in phase with the stator flux as shown in FIG. 3C. Thus, the resultant rotor flux phase tends to become aligned with the stator flux phase before any appreciable torque is produced.

As shown in FIG. 3B, a sequence of small but increasing stator currents is applied during the first 150-millisecond period of operation defined by the rotor time constant. These produce a current profile that is shown as a ramp function from a point where initially flux has not been established in the rotor. The magnitude of the currents is selected to develop approximately 10% of normal saturated rotor flux by the end of this first 150-millisecond period. Then, a further ramp function or a step function of current for producing steady-state flux may be applied without causing abrupt transient movements of the motor drive shaft.

Figure 3D:
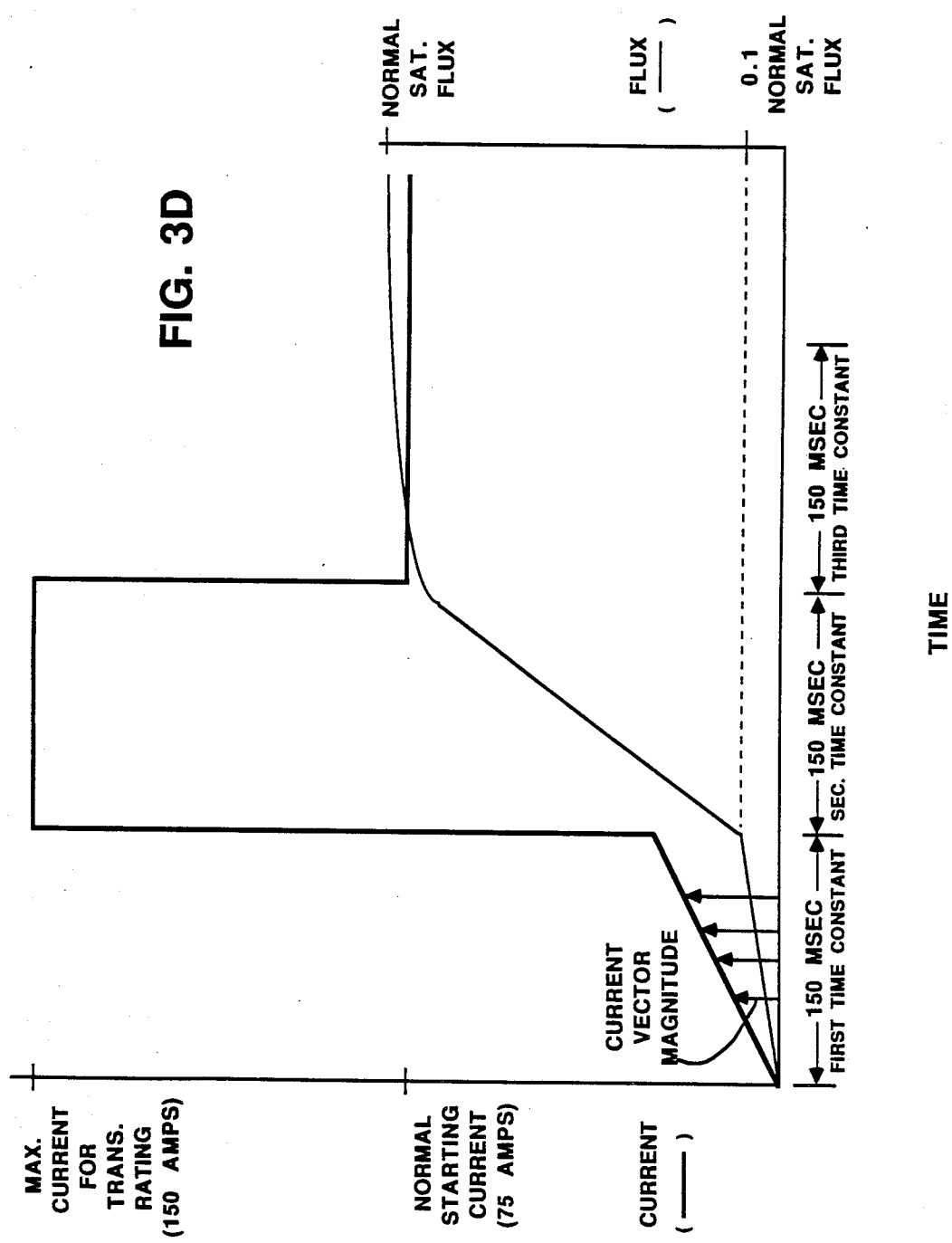
FIG. 3D is a graph of stator current and flux vs. time where the first and second aspects of the invention are combined.

It is a third aspect of the invention that the above two startup techniques may be combined in a single startup sequence as shown in FIG. 3D. The above two techniques tend to complement each other in that the first technique shortens startup time, but may aggravate the problem of transient torques, while the second technique inhibits transient torques but increases startup time.

In the third aspect of the invention a ramp current profile is generated by a sequence of low-level current vectors during the first 150-millisecond period corresponding to one rotor time constant. A higher current of 150 amps equal to the current rating of the power semiconductors in the inverter is applied during the second 150-millisecond period corresponding to the second rotor time constant, to bring the rotor flux up to its normal saturated flux level in approximately two time constants. At the end of this period (300 milliseconds), the applied current is reduced to the current of 75 amps which will maintain normal saturated flux in the rotor.

Figure 1:
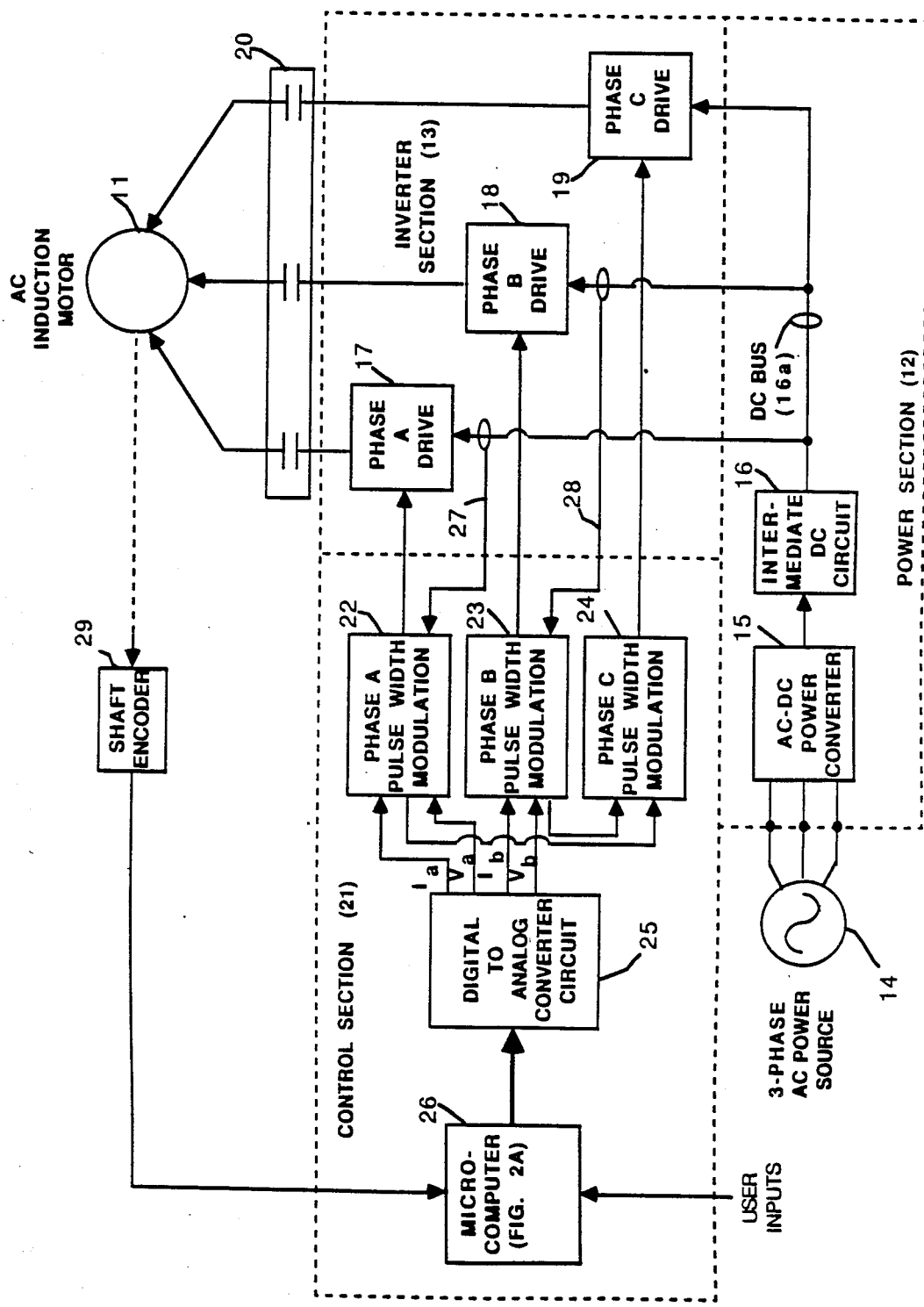
FIG. 1 is a block diagram of a motor control system that incorporated the invention.

Referring to FIG. 1, the invention is practiced in a motor control system 10 which is referred to in the art as a "motor drive". This particular motor control system is applied to controlling AC induction motors such as the 3-phase induction motor 11 illustrated in FIG. 1.

The drive 10 includes a power section 12 and an inverter section 13 which convey power from a 3-phase, 60-hertz, AC voltage source 14 to the motor 11. The power source 14 is connected through power terminals to an AC-to-DC power converter 15. The key component of such converters 15 is a 3-phase diode bridge rectifier, which rectifies the alternating current power line signals to provide direct current power signals for each of the three respective phases of the motor 11. The converter 15 may also include a set of power semiconductor switches connected in parallel with the diodes in the bridge for operation in a regeneration or braking mode when power is fed back to the power source 14.

An intermediate DC circuit 16 is connected to the outputs of the converter 15 to receive the DC signals. In the example described here the intermediate DC circuit is constructed with a large capacitor in a manner known in the art to act as relatively stiff (load-independent) DC voltage source. The three DC voltages are fed through a DC bus 16a to Phase A, Phase B and Phase C drive circuits 17–19 in an inverter section 13, and there the DC voltages are converted back to AC signals that are fed to the stator of the motor 11 through an AC contactor 20 having three pairs of normally open contacts and a coil suitable for operation at 60-hertz.

The Phase A, Phase B and Phase C drive circuits 17–19 include a set of six power semiconductors which are connected in a bridge network familiar to those skilled in the art. A set of diodes is provided in one-to-one parallel relationship with the semiconductors to rectify power returned from the motor to the DC circuit 16 during regenerative operation.

In converting DC signals to AC signals to be fed to the motor 11, the present drive system 10 utilizes pulse width modulation, which provides both DC-to-AC power conversion and a technique for controlling the speed and torque of the motor 11. Pulse width modulation will be discussed further in connection with the control section 21 of the drive 10.

For further details regarding a suitable AC-to-DC power converter 14, intermediate DC circuit 16 and the power portions of the inverter section 13, reference is made to an allowed U.S. patent application of Fulton et al., Ser. No. 646,411 filed Aug. 31, 1984.

The control section 21 of the drive 10 includes three pulse width modulation (PWM) modules 22–24 for controlling the current supplied to the motor 11 through the Phase A, Phase B and Phase C drive circuits 17–19. The PWM modules 22 and 23 receives analog signals such as phase current command ($I_a$, $I_b$) and phase voltage command ($V_a$, $V_b$) signals from a digital-to-analog converter circuit 25. The current command signals ($I_a$, $I_b$) are resolved for each phase from a vector control parameter, which includes a magnitude ($I_{mag}$) and phase angle ($\theta$) of current to be supplied to the three-phase stator windings on the motor 11. The vector control parameter is calculated by the microcomputer 26 and transmitted to the digital-to-analog converter circuit 25.

A current control loop is provided on each of the PWM modules 22 and 23 by algebraically summing current feedback signals received through lines 27 and 28 with the current command signals for Phase A and Phase B ($I_a$, $I_b$). As described in U.S. Pat. No. 4,306,182 entitled "Polyphase Motor Drive System With Balanced Modulation", the third PWM module 24 receives the inverted sum of the current error signals from the other two phases and develops current command signals for the Phase C drive circuit 19 that are in balance with the current command signals driving the Phase A and Phase B drive circuits 17 and 18.

As will be explained in more detail below, the microcomputer 26 executes a stored program to control the speed and torque of the motor 11 through the circuitry described above. The microcomputer 26 receives shaft position data from a shaft encoder 29 mounted on a rotor shaft of the motor 11. From this data, microcomputer 26 can determine both the angular position of the rotor shaft and the angular velocity at which the shaft is rotating. To execute a velocity control loop, the microcomputer 26 also receives a commanded velocity from one of the user input devices represented in FIG. 1. The difference between the commanded velocity and the actual velocity is determined by the microcomputer 26 to produce a velocity error signal. The velocity error signal drives a torque command signal which in turn drives the current command signals ($I_a$, $I_b$) for the respective phases and this in turn drives the motor to the commanded speed and torque.

Figure 2A:
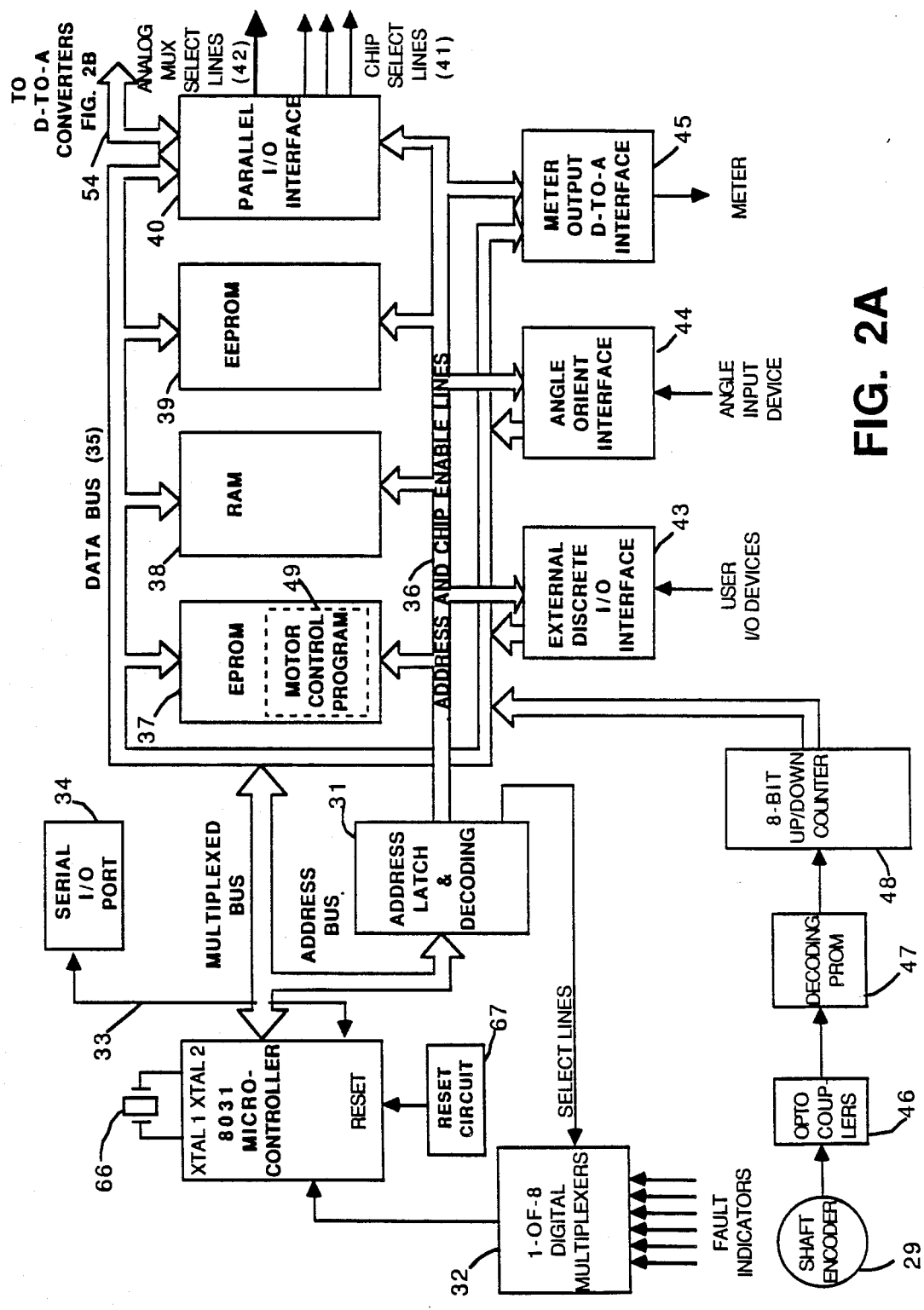
FIGS. 2A and 2B provide a more detailed block diagram of the system of FIG. 1.

FIG. 2A shows further details of the microcomputer 26. The controlling element is a microcontroller 30, which in this embodiment is a Model 8031 Microcontroller available from Intel Corporation, Santa Clara, Calif. This device combines a microelectronic CPU with on-board oscillator and clock circuitry, on-board timer and counter circuitry, an on-board serial I/O port and a Boolean (single-bit oriented) processor. A crystal 66 is connected to XTAL 1 and XTAL 2 inputs on the microcontroller 30 to drive the CPU at a suitable frequency such as 12 Mhz.

The mictrocontroller 30 has four bidirectional I/O ports (I/O Ports 0-3). I/O Port 0 connects to a multiplexed bus that carries eight bits of address information at one time and eight bits of data at another time. This bus is connected to an address latch which is part of the address latch and decoding circuitry 31. The lower eight bits of address information are captured in the latch and held until the data is transmitted with the upper eight bits of address. I/O Port 2 is connected to an address bus that carries the upper eight bits of a sixteen-bit address generated by the microcontroller 30. Some of the upper bits of address information are decoded by circuitry 31 to generate chip enable signals to memory circuits and other circuits in the microcomputer portion of the drive.

One of the lines in I/O Port 1 on the microcontroller 30 is connected to the outputs of a pair of 1-of-8digital multiplexers 32 which interface a number of external faultindicating inputs to the microcontroller 30. A group of three select lines and one enable line are connected from the circuitry 31 to inputs on the multiplexers 32 to select the individual fault signal that is sensed by the microcontroller 30 at a given time.

I/O Port 3 includes certain special purpose inputs and outputs for connecting the microcontroller 30 to a serial data communication line 33. In this example the line 33 is then connected to a serial I/O port 34 for the motor control system 10. This serial communication link is typically used for connecting a programming terminal (not shown) to the microcomputer 26.

Another element connected to the microcontroller 30 in FIG. 2A is a reset circuit 67. This circuit provides both power-up and system resets and connects to a corresponding RESET input on the microcontroller 30.

This has been by way of a general description of the hardware interfaces to the microcontroller 30. For further details regarding the architecture, operation and instruction set for this microcontroller 30, reference is made to the 1985 Microcontroller Handbook and other commercial literature available from Intel Corporation, Santa Clara, Calif.

The microcontroller 30 is connected through the data bus lines 35, and through the address and chip enable lines 36 to an EPROM (erasable programmable read-only memory) 37 of 48k bytes, to a RAM (random access memory) 38 of 4k bytes and to an EEPROM (electrically erasable and programmable read-only memory) 39 of 2k bytes. A motor control program 49 for directing the operations of the microcontroller 30, and ultimately the operations of the motor 11, is stored as object code in the EPROM 37. Variables that are processed during execution of the program 49 are stored in the RAM 38. Motor parameters which are changed infrequently or slowly in relation to the execution time of the microcontroller program 49 are stored in the EEPROM 39. These may be altered by executing a write operation, but as the operation is relatively time consuming, it is performed only when there is sufficient time for its execution and only when new motor operating parameters have been communicated to the microcontroller 30.

The microcontroller 30 is also connected through the data bus lines 35 and the address and chip enable lines 36 to a parallel I/O interface circuit 40, which in this example is an 8255A Programmable Peripheral Interface circuit manufactured by Intel Corporation, Santa Clara, Calif. This circuit provides addressable I/O ports which the microcontroller 30 can utilize to send and receive data from additional I/O interface circuitry shown in FIG. 2B. Data can be directed through the data bus lines 35 and the parallel I/O interface circuit 40 to or from certain circuits in FIG. 2B. These circuits can be activated and selected for communication through the chip select lines 41 shown in FIG. 2A. Signals are transmitted on these lines 41 in response to the decoding of information transmitted to the parallel I/O interface circuit 40 through certain address and chip enable lines 36. Also shown are a group of analog multiplexing (ANALOG MUX) lines 42 for selecting specific inputs coupled through a multiplexing circuit to be discussed below.

Also shown in FIG. 2A are interfaces 43-45 for certain external user equipment. The address and chip enable lines 36 and the data bus lines 35 connect to the interfaces 43-45 to provide communication with the microcontroller 30. The first of these interface 43 is for discrete (single-bit oriented) I/O devices. This interface 43 may connect to 24-volt DC solid state inputs and outputs for input functions such as RUN, JOG, TORQUE LIMIT, HIGH/LOW ACCEL RATE and for output functions such as a 5-bit fault code, a motor brake signal, fault signals and speed indicator signals. This interface may also provide relay output signals as well as solid state output signals.

Two other interfaces for connecting external user equipment are the angle orient interface 44 and the meter output D-to-A interface 45. The orient interface 44 may be connected to an external device for orienting the motor shaft to a predetermined angle. The meter output D-to-A interface 45 may be connected to a meter that utilizes unipolar analog voltages in the range of 0-10 volts to operate a display showing the present speed, torque and power of the motor 11.

Also shown in FIG. 2A are further details of the interface for connecting the microcontroller 30 to receive signals from the shaft encoder 29. The encoder 29 generates two signals in quadrature (a 90° phase difference) to signal incremental angular movements of the shaft and a marker signal for each revolution of the shaft. The interface includes opto coupler circuits 46 to couple these signals to a decoding PROM 47 which converts these inputs to a bit stream that is fed to an 8-bit up-/down counter 48. A signal responsive to the direction of shaft rotation is fed to an up/down directional input on the counter 48. The digital shaft position is periodically transferred to a latch (not shown) and periodically read by the microcontroller 30. For further details concerning this interface, reference is made to Dummermuth, U.S. Pat. No. 4,510,565, issued Apr. 9, 1985.

Figure 2B:
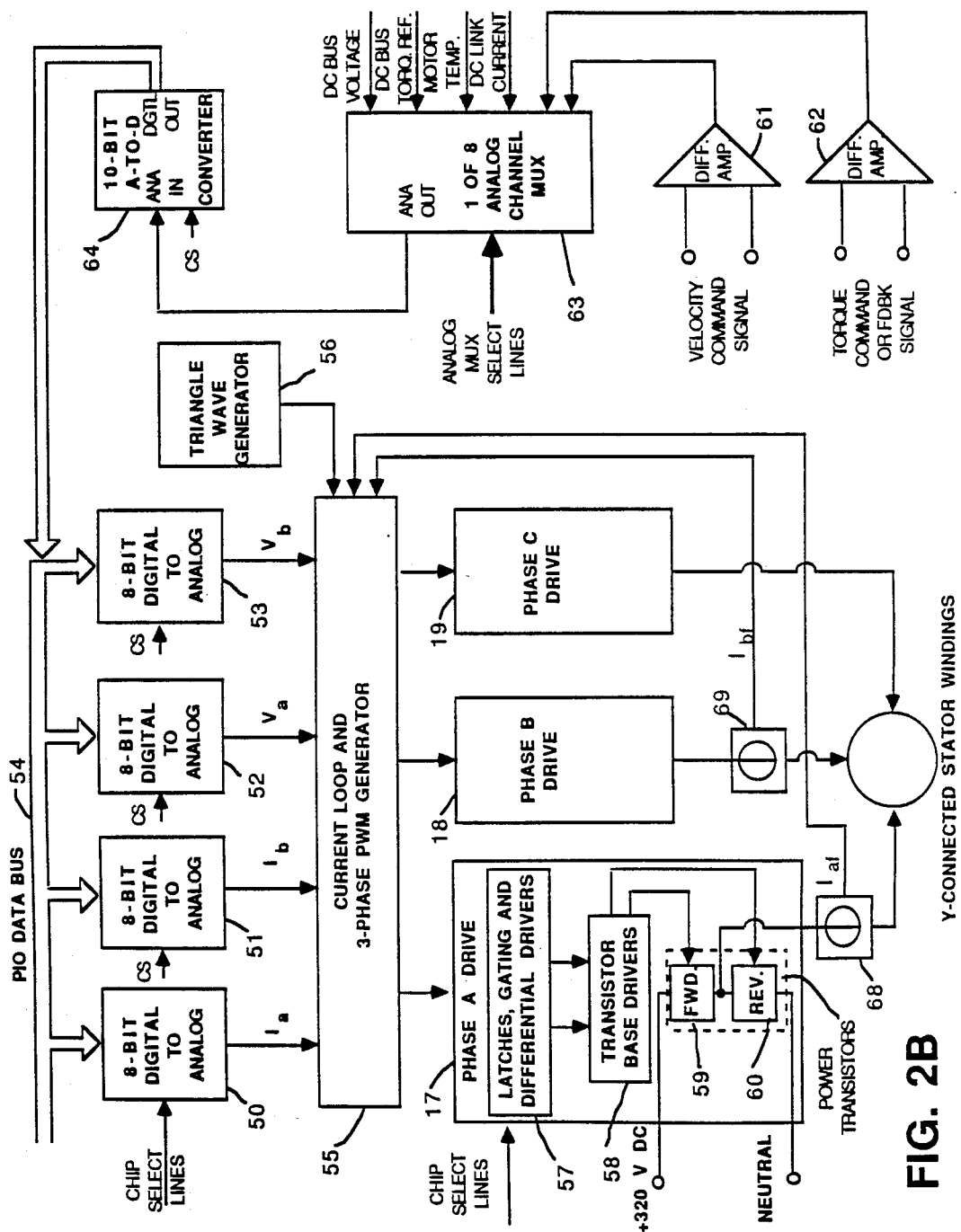

In connecting the circuitry in FIGS. 2A and 2B to the microcontroller 30, a number of interfacing elements known as bus buffers are employed. These buffers have not been shown to avoid immaterial detail in the drawings. The number and location of these buffers may vary according to the number of circuit boards that are used, and it is considered within the skill in the art to use these bus buffers where necessary.

FIG. 2B shows further details of the digital-to-analog converter circuit 25 and the Phase A, Phase B and Phase C drive circuits 17–19 of FIG. 1. FIG. 2B also shows additional interfaces for sensing certain motor parameters and for receiving inputs from the user or external equipment.

The digital-to-analog converter circuitry 25 comprises four multiplying 8-bit digital-to-analog circuits 50–53 which receive bytes of data from the parallel I/O interface circuit 40 through PIO data bus 54 and convert the digital information to analog signals. The commercial circuits preferred for use as the digital-to-analog circuits 50 are AD7528 dual 8-bit buffered monolithic multiplying D-to-A converters manufactured by Analog Devices, Inc., Norwood, Mass. The first digital-to-analog citcuit 50 provides the analog signal for the phase A current $I_a$. The second digital-to-analog circuit 51 provides the analog signal for the phase B current $I_b$. The third and fourth digital-to-analog circuits 52 and 53 provide the analog signals for the phase A and phase B voltages, $V_a$ and $V_b$, respectively.

The analog outputs of the digital-to-analog circuits 50–53 are fed to inputs on the current loop and PWM generator circuitry 55 which represents the combination of blocks 22–24 in FIG. 1. These analog outputs for the phase currents $I_a$ and $I_b$ are sine wave signals which are received by the PWM circuitry and algebraically summed with respective current feedback signals $I_{af}$ and $I_{bf}$ provided by current sensors 68 and 69 in the Phase A and Phase B lines going to the motor 11. This provides current error signals and current control loops for the phases as known in the art. The outputs of the phase current control loops are fed as sine wave current signals to the PWM generator. A triangular wave is generated by a corresponding generator 56 to another input on the PWM generator circuitry 55. The triangular wave is superimposed on the sine wave current signals to provide crossing points, which are used as a reference for varying the width of notches or intervals between square wave pulses in a pulse train. The resulting pulse width modulated signals are applied to control the Phase A, Phase B and Phase C drive circuits 17–19. This technique allows the application of the DC bus voltage for short time intervals across the terminals of the motor 11, and it provides a net current which is an alternating current of adjustable frequency and magnitude.

One of the Phase drive circuits 17 has been shown in greater detail in FIG. 2B and the other two circuits 18 and 19 are identical as to the illustrated circuitry. The drive circuit 17 includes latches, gating and differential drivers 57 which are enabled through chip select lines 41 from the parallel I/O interface circuit 40 and which receive the pulse width modulated signals from the circuitry 55. The pulse width modulated signals are converted by transistor base driver circuits 58 to signals suitable for switching of two power transistors 59 and 60 on and off through their bases and these signals are therefore referred to as base drive signals.

In this example, the stator or stationary outer portion of the motor 11 has its phase winding connected in a Y-configuration. A 320-volt DC supply voltage is applied across the transistors 59 and 60 so that when one transistor conducts with a transistor in another phase drive circuit 18 or 19, current will flow through two of the phase windings (two legs of the Y). One transistor 59 conducts current in the forward direction through its respective phase winding in the stator portion of the motor 11 and therefore it has been labeled "FWD". The other transistor 60 conducts current flowing in the reverse direction at another time and therefore it has been labeled "REV". By controlling the switching times of the transistor pairs in the respective drive circuits 17–19 in response to the pulse modulated signals a current vector of the commanded magnitude and phase, $I_{mag}$ and $\theta$, is supplied to the motor 11.

Also shown in FIG. 2B is an interface for sensing certain motor parameters and for receiving inputs from the user or external equipment. These parameters include the voltage and current on the DC bus shown in FIG. 1, a DC bus torque reference and a motor temperature input. These signals are provided by sensors not shown in drawings. The interface also receives a velocity command input from the user and a manual input torque command or a torque feedback signal from external equipment that may be used in conjunction with the equipment described herein.

The interface includes two differential amplifiers 61 and 62 for coupling the velocity command signal and the torque command or feedback signal to two analog inputs on an 8-channel analog multiplexer 63. Four other inputs on this circuit receive signals for the voltage and current on the DC bus 16a, the DC bus torque reference and the motor temperature. In response to the analog multiplexing (ANALOG MUX) signals received from the parallel I/O interface circuit 40, the signal on one input channel is selected for coupling through an analog output (ANA OUT) to an analog input (ANA IN) on an A-to-D converter 64.

The A-to-D converter 64 is a 10-bit analog-to-digital converter which outputs 10-bit of data on the PIO data bus 54 in two successive bytes, eight bits in one byte and two bits in another byte. This occurs when the outputs of the circuit 64 are activated through the chip select lines 41. The commercial circuit preferred for use as the A-to-D converter 64 is the ADC 1001 10-bit A-to-D converter manufactured by National Semiconductor, Santa Clara, Calif., and the commercial circuit preferred for use as the analog multiplexer 63 is a Type 4051 1-of-8 analog multiplexer available from several manufacturers such as Motorola Semiconductor, Phoenix, Ariz. and RCA Solid State, Somerville, N.J.

Figure 4:
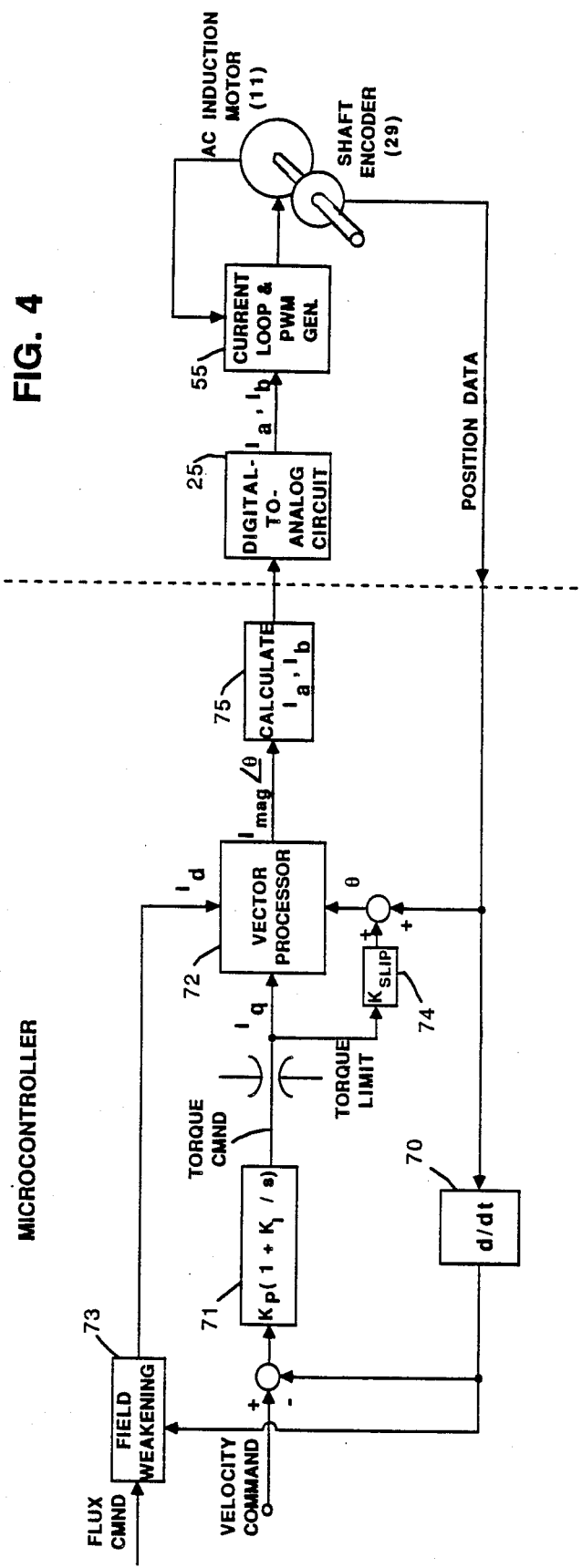
FIG. 4 is a control loop diagram of the motor control system of FIGS. 1, 2A and 2B.

Having described the electronic circuitry for carrying out the invention, this description will next address the programmed operation of the microcontroller 30. As seen in FIG. 4, the microcontroller 30 receives a velocity command from the user through the hardware previously described in relation to FIG. 2B. The microcontroller 30 also receives position data from the shaft encoder 29. The microcontroller 30 performs a differentiation calculation (d/dt) represented by block 70 to determine the actual velocity. The actual velocity is algebraically summed (in this case subtracted) from the velocity command to obtain a velocity error signal which is an input to the block 71 representing a transfer function that is applied to obtain a torque command value. The transfer function is essentially a proportional and integral function of the type well known in the art, where $K_p$ is a proportionality constant, $K_I$ is integral constant and where $1/s$ is the Laplace transform function for integration. These operations constitute a velocity control loop.

The torque command is compared to certain torque limits, and if it exceeds those limits, the limits are applied to maintain satisfactory operation of the motor 11. The torque command is represented by $I_q$, which is the vector component of current that is required to produce the commanded torque in the motor 11. This command is an input to a portion of the microcontroller operation represented by block 72 and referred to as the vector processor. In executing the vector processor operation, the microcontroller 30 calculates a three-phase vector having the magnitude ($I_{mag}$) and the phase angle $\theta$ required to produce the commanded torque and speed.

Besides the torque-producing component $I_q$ of the current vector $I_{mag}\angle\theta$ the other inputs to the vector processor operation are a flux-producing component $I_d$, which lags the torque-producing component in phase by 90 degrees, and a reference shaft angle $\theta_R$ from which the microcontroller 30 determines the angle to which the shaft would be moved. The reference shaft angle $\theta_R$ is determined as the algebraic sum of the actual shaft angle and the slip angle at which the motor should be operated. The slip angle is calculated by multiplying the torque command by a slip factor $K_{SLIP}$. A table of slip factors for the particular motor 11 is stored in the EPROM 37.

Figure 5:
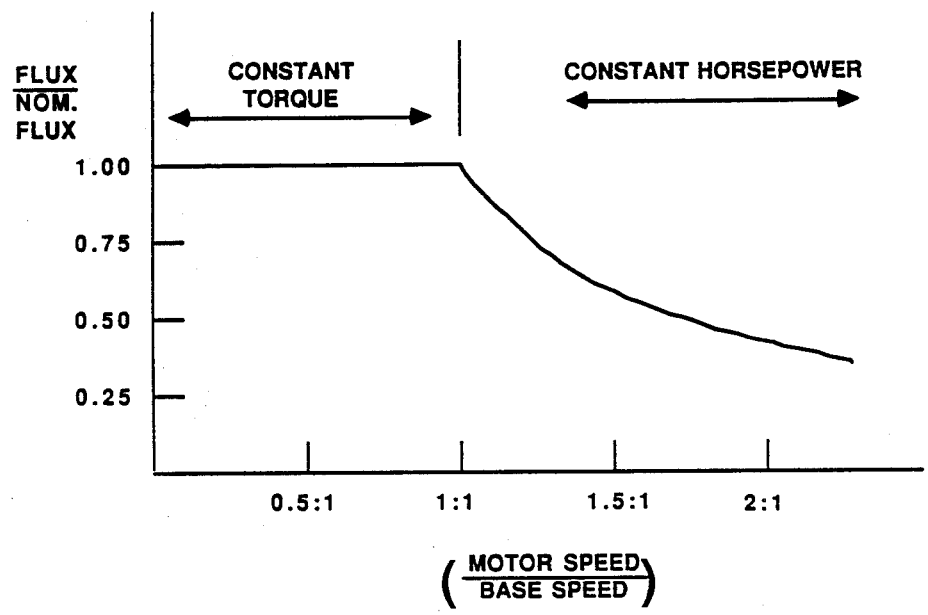
FIG. 5 is a graph of flux vs. motor speed for a typical AC motor of the type seen in FIG. 1.

At this point it should be appreciated that the motor is operated in two regions as illustrated in FIG. 5, a constant torque region and a constant horsepower region. Neglecting startup operation for the moment, constant torque is produced when the motor is operated between zero speed and a speed known as "base speed" which is specified for each particular motor. After reaching base speed, the speed of the motor may be increased by weakening the field and reducing the flux acting on rotor. In current vector control apparatus, this is accomplished by controlling the flux-producing component of current $I_d$.

In the present motor drive apparatus, the microcontroller 30 determines a flux command when the motor is to be operated in the field weakening (constant horsepower) range. This is a first input and the actual speed of the motor is a second input to a field weakening control operation executed in the microcontroller program and represented by block 73 in FIG. 4. The output of this operation is the flux-controlling component of current $I_d$.

The output of the vector processor operation 72 is an input to a calculation portion of the microcontroller operation which calculates the phase currents $I_a$ and $I_b$ as digital values that are output to the digital-to-analog converter circuitry 25. This circuitry converts the digital signals to analog signals that are then fed to the current loop and PWM circuitry 55 to control the motor 11.

Figure 6:
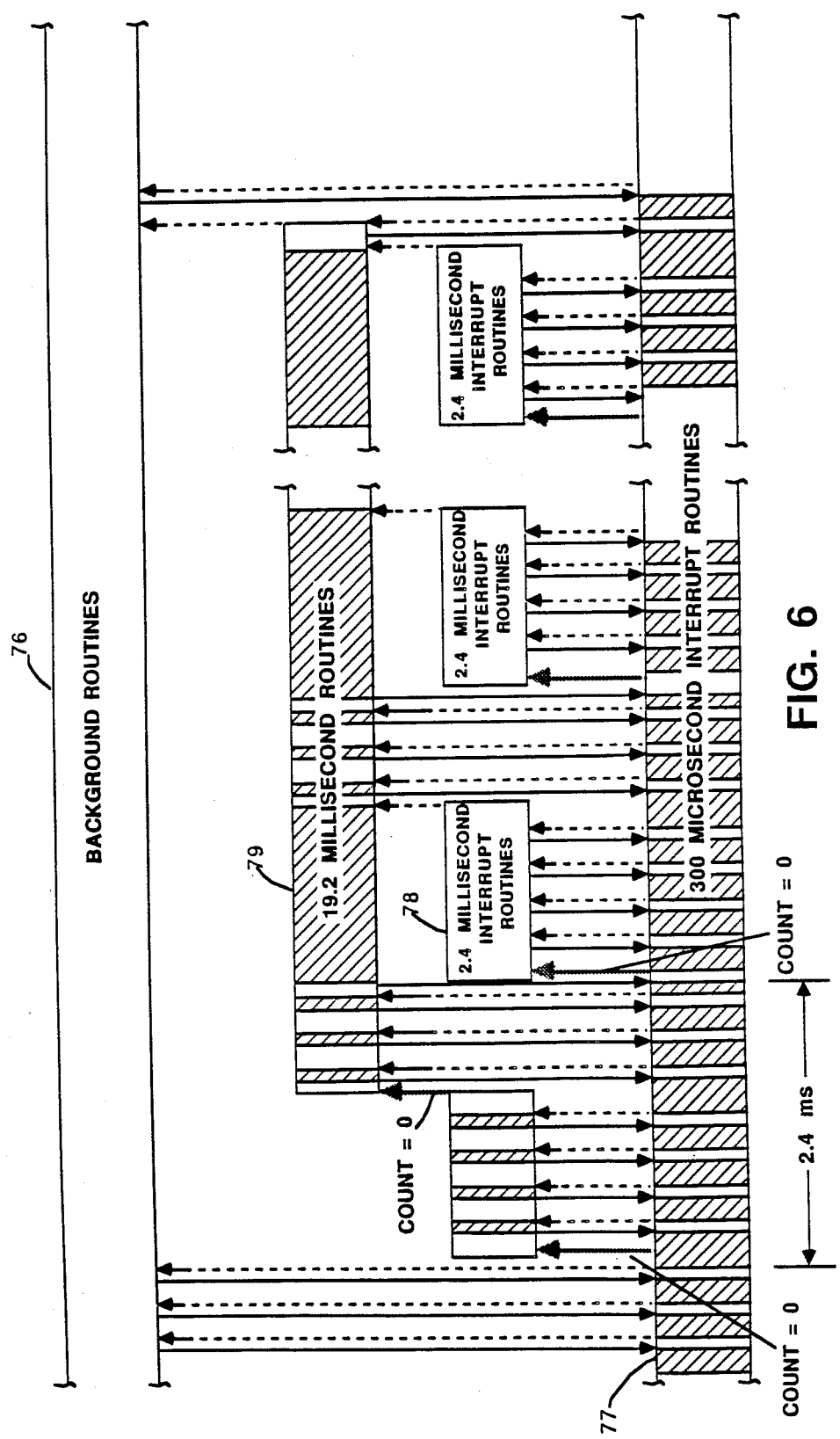
FIG. 6 is a diagram showing the organization of program routines executed by the motor control system of FIGS. 1, 2A and 2B.

Referring next to FIG. 6, the motor control program is organized by grouping routines according to how often each group of routines is executed. Background routines represented by band 76 are executed only when not interrupted for execution of higher priority routines in the other three bands 77-79. The background routines 76 in this example are executed primarily to handle communication through the serial I/O port 34 seen in FIG. 2A.

Certain routines that must be executed frequently to keep pace with the real time operation of the motor 11 are included in a group of 300-microsecond interrupt routines 77. These routines include instructions for reading the shaft encoder 29, estimating actual velocity, updating the angle input to the vector processor and outputting the digital values for phase currents $I_a$ and $I_b$.

A second group of routines that must be executed frequently to keep pace with real time operation of the motor 11, but not as frequently as the 300-microsecond interrupt routines 77, are included in a group of 2.4-millisecond interrupt routines 78. These routines include instructions for reading conditions from sensors on the motor and running the velocity loop operation.

A third group of routines which receives values passed from the first and second groups of interrupt routines 77 and 78 and performs the overall control and supervision of the motor drive operation are included in a group of 19.2-millisecond interrupt routines 79.

Timer interrupts are generated within the microcontroller 30 to initiate execution of these respective groups of routines. When the microcontroller 30 begins operation, it initializes a 300-microsecond internal timer that will generate an interrupt signal at the end of that period. When this occurs, the microcontroller 30 will interrupt the execution of the background routines 76 and jump to execution of the 300-microsecond interrupt routines 77. This is illustrated by the first solid line arrow in FIG. 6. When execution is completed (less than 300 microseconds later), the microcontroller 30 returns to execution of the background routines 76 as illustrated in FIG. 6 by the first dashed line arrow.

The motor control program maintains two counters to generate the 2.4-millisecond and 19.2-millisecond interrupts. The first counter is initialized at eight (8) and decremented by one after each execution of the 300-microsecond interrupt routines 77. When the count reaches zero, the microcontroller 30 does not return to the background routines 76, but instead jumps to the 2.4-millisecond interrupt routines 78, as represented by the shaded arrow in FIG. 7. It should be noted that execution of the 2.4-millisecond interrupt routines 78 will not consume a full 2.4 milliseconds, and that it is the period from the start of one 2.4-millisecond execution cycle to the start of another 2.4-millisecond execution cycle that last 2.4 milliseconds.

During execution of 2.4-millisecond interrupt routines 78, interrupts will continue to be generated for the 300-microsecond interrupt routines 77 as represented by the solid interrupt arrows and the dashed return arrows. The unshaded areas of the bands 77-79 represent periods of execution while the shaded areas represent interrupted periods. The widths of the shaded and unshaded areas have been adjusted where necessary to show the interrupts, and should not be considered as being drawn to scale.

A second counter is initialized at eight (8) and decremented by one after each execution of the 2.4-millisecond interrupt routines 78. When the count reaches zero, the microcontroller 30 does not return to the background routines 76 or the 300-microsecond interrupt routines 77, but instead jumps to the 19.2 millisecond interrupt routines 79, as represented by the second shaded arrow from the left.

During execution of the 19.2-millisecond interrupt routines 79, interrupts, will continue to be generated for the 300-microsecond interrupt routines 77 as represented by the solid interrupt arrows and the dashed return arrows, and after eight such interrupts, the 2.4-millisecond interrupt routines 78 will be initiated. When a cycle of the 2.4-millisecond interupt routines is completed, the microcontroller 30 will return to execution of the 19.2-millisecond interrupt routines 79 for a short time until the next 300-microsecond interrupt.

The flux and current profiling command values are calculated within the 19.2-millisecond interrupt routines 79 and output during the 300 microsecond interrupt routine 77. After start of the 19.2 millisecond interrupt, represented by start block 80 in FIG. 7, the microcontroller 30 executes a block of instructions 81 to check for hardware and program execution faults. Next, as represented by input/output block 82, signals are read from the discrete input and output devices connected to the interface 43 described in relation to FIG. 2A. As represented by process block 83, the microcontroller 30 then enters a state sequencing portion of the program in which the microcontroller 30 executes a selected routine according to the present state maintained by the program.

In the state sequence, the state variable is initialized at zero, and according to certain conditions that may be examined during execution of the STATE O routine, the state variable may or may not be changed to the next state—STATE 1. If the state variable is advanced, the STATE 1 routine will be executed during the next cycle through the 19.2-millisecond interrupt routines 79.

Figure 7:
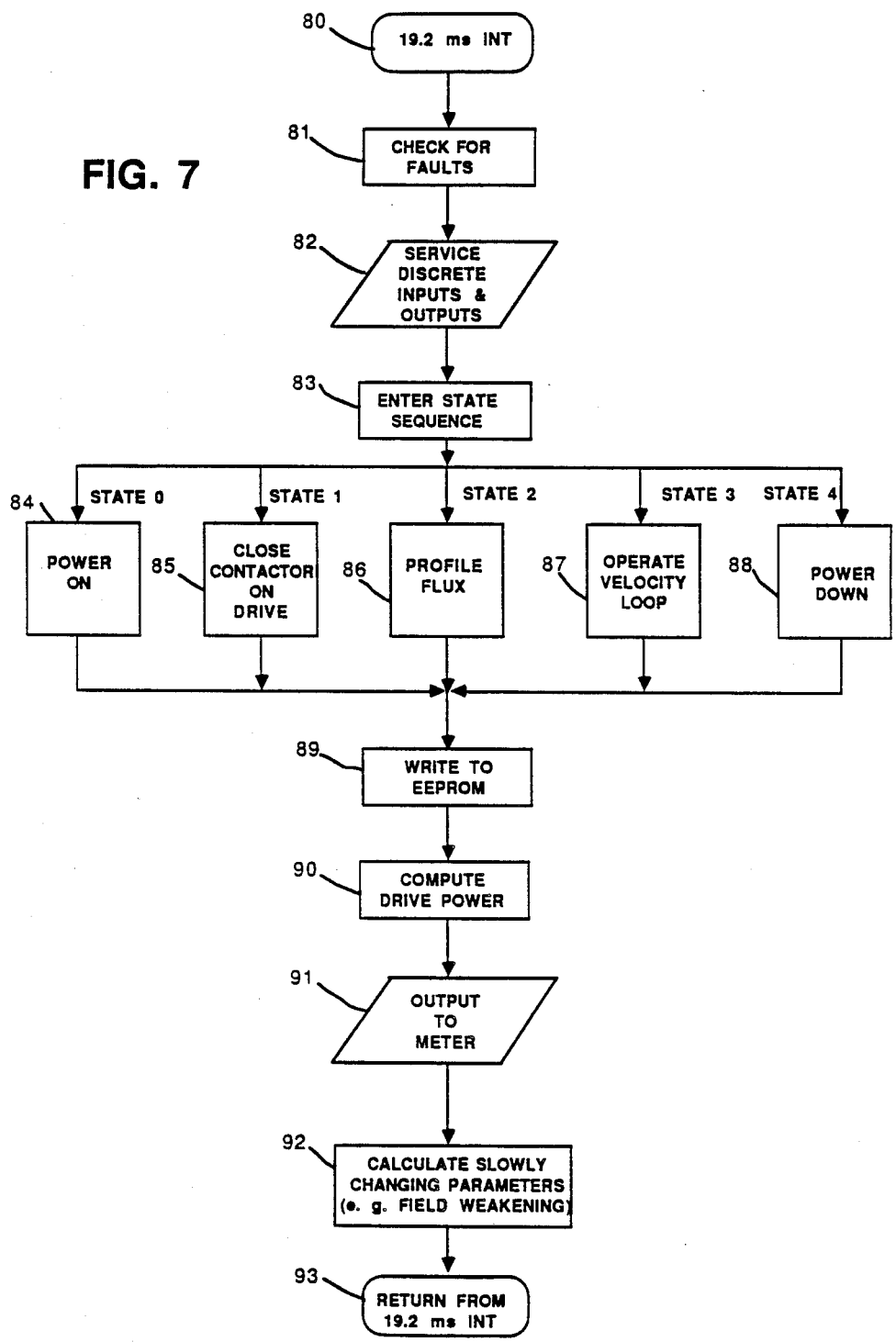
FIG. 7 is a flow chart of the 19.2-millisecond interrupt routines represented in FIG. 6.

The state routines are represented by process blocks 84–88 in FIG. 7. The STATE 0 routine, represented by process block 84, is executed when power is first applied. During this routine the electronic circuitry in the drive 10 is prepared to control the motor 11. The STATE 1 routine, represented by process block 85, is executed in a subsequent cycle to close the contactor 20 on the drive 10 to apply power to the motor 11. The STATE 2 routine, represented by process block 86, is executed in a subsequent cycle to generate commands for the the flux and current profiling functions discussed earlier in relation to FIGS. 3A–3D. The STATE 3 routine, represented by process block 87, is executed in a subsequent cycle to perform the velocity control loop operations discussed earlier in relation to FIG. 4. And, the STATE 4 routine, represented by process block 87, is executed in a subsequent cycle to prepare the drive 10 for interrupting power to the motor 11. The STATE 2 routine and the STATE 3 routines may be executed for a number of cycles through the 19.2-millisecond interrupt routine before the state variable is advanced to the next state.

Following execution of the appropriate one of the state sequencer routines 84–88, the microcontroller 30 executes a sequence, represented by process block 89, to write new motor parameters in the EEPROM 39. Next, as represented by process block 90, the microcontroller 30 computes the level of power to be applied to the motor 11. Then, as represented by input/output block 91, signals are transmitted to the meter interface 45 discussed earlier in relation to FIG. 2A, to provide signals to a user-provided meter display. Following this, the microcontroller 30 calculates slowly changing parameters, such as those used in determining how much field weakening should be employed to reach speeds above base speed, and this is represented by process block 92. Following these operations the microcontroller 30 returns to one of the other groups of routines in FIG. 6 and this is represented in FIG. 7 by return block 93.

Figure 8:
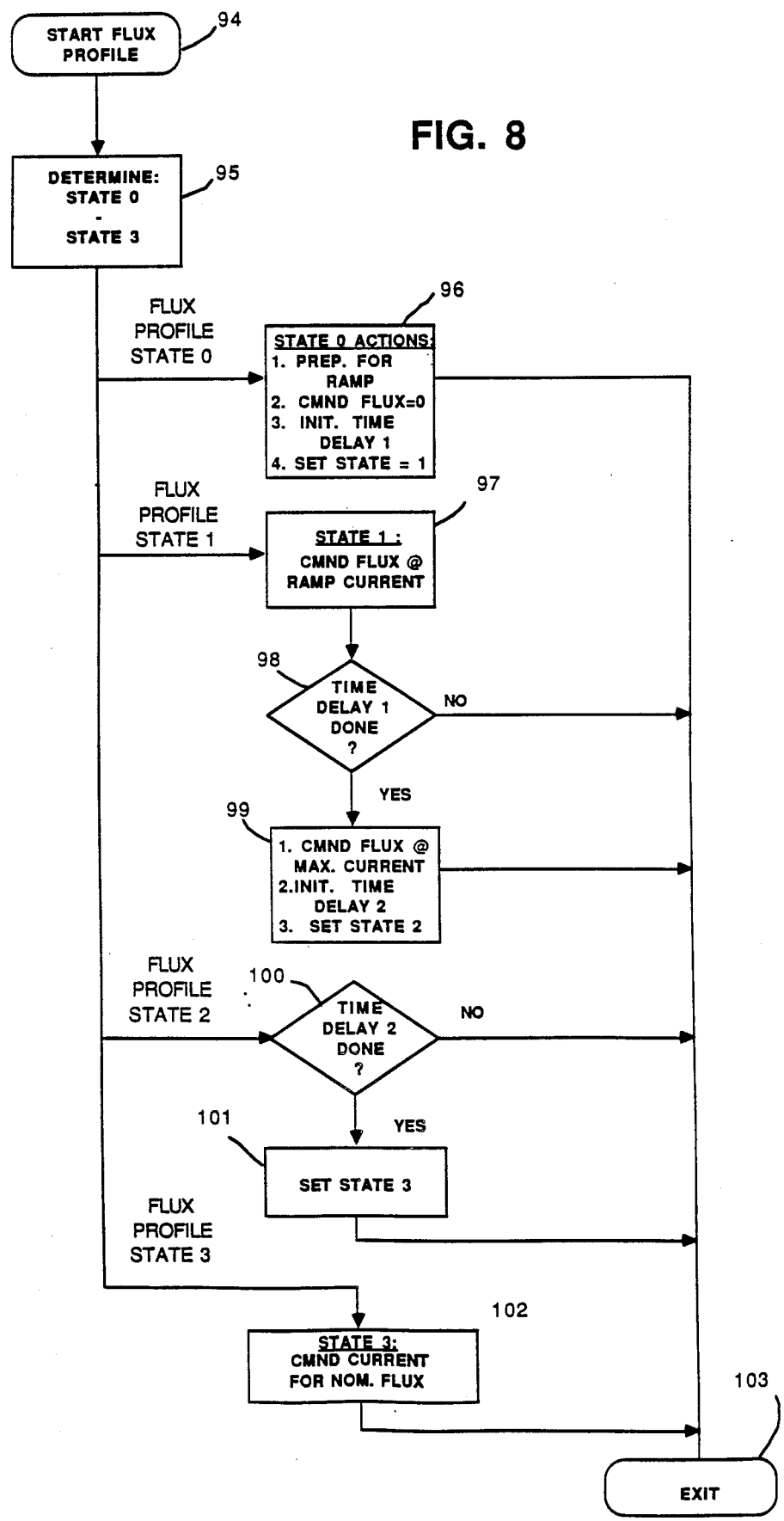
FIG. 8 is a flow chart of the flux profiling routines represented in FIG. 7.

The STATE 2 routines for current and flux profiling during motor startup are shown in detail in FIG. 8. These routines are organized with a state sequencer that is nested within the larger state sequencer for 19.2-millisecond interrupt routines 79. The start of the flux profiling state routine is represented by start block 94. This is followed by execution of the nested state sequencer, represented by process block 95, to determine which state should be executed in the current cycle through the flux profiling routines.

The routines in FIG. 8 are applicable to the two-segment current and flux profiling in FIG. 3D, however it should be understood that only a portion of these routines need be executed to perform either of the single-segment current and flux profiles illustrated in FIGS. 3A and 3B.

Assuming FLUX PROFILE STATE 0 of the flux profiling sequencer is to be executed, the microcontroller 30 executes instructions represented by process block 96 to prepare for commanding a series of small but increasing stator currents that follow the ramp function portion of the improved current profile in FIGS. 3B and 3D. For example, instructions are executed to initialize (prepare for) execution of a "TIME DELAY 1." While initializing instructions are being executed, the commanded flux is zero. After the appropriate initialization functions are completed in FLUX PROFILE STATE 0, the state sequence variable is changed to FLUX PROFILE STATE 1, so that the FLUX PROFILE STATE 1 sequence will be executed in the next cycle through the flux profiling routines. The microcontroller 30 then exits the flux profiling routines and returns to the other 19.2-millisecond interrupt routines 79, as represented by the exist block 103.

Assuming FLUX PROFILE STATE 1 of the flux profiling sequencer is executed next, the microcontroller 30 executes instructions represented by process block 97 to generate the series of small but increasing stator current values that follow the ramp function portion of the improved current profile in FIGS. 3B and 3D. A first time delay is started and this time delay would be 150 milliseconds for the examples illustrated in FIGS. 3B and 3D. The time delay and ramp function are selected to produce 10% of normal saturated rotor flux by the end of the delay period. The execution of the delay is represented by decision block 98, which represents instructions that are executed in each cycle through the FLUX PROFILE STATE 1 sequence to test for completion of the delay. When the delay is completed, as represented by the "YES" result branching downwardly from decision block 98, the microcontroller 30 executes further instructions represented by process block 99 to command the high level of current (150 amps) shown in FIGS. 3A and 3D. The state sequence variable is then changed to FLUX PROFILE STATE 2, so that the FLUX PROFILE STATE 2 sequence will be executed in the next cycle through the flux profiling routines. And, preparation is made for executing a "TIME DELAY 2" in FLUX PROFILE STATE 2. The microcontroller 30 then exits the flux profiling routines and returns to the other 19.2-millisecond interrupt routines 79, as represented by the exit block 103.

Assuming FLUX PROFILE STATE 2 of the flux profiling sequencer is executed next, the microcontroller 30 executes instructions represented by decision block 100 to execute the second time delay for the period in which the high level of current (150 amps) is to be supplied to the motor 11. When this delay is completed, as represented by the "YES" result branching downwardly from decision block 100, the microcontroller 30 executes further instructions represented by process block 101 to advance the state sequence variable to FLUX PROFILE STATE 3, so that the FLUX PROFILE STATE 3 sequence will be executed in the next cycle through the flux profiling routines. The microcontroller 30 then exits the flux profiling routines and returns to the other 19.2-millisecond interrupt routines 79, as represented by the exit block 103.

Assuming FLUX PROFILE STATE 3 of the flux profiling sequencer is executed next, the microcontroller 30 executes instructions represented by process block 102 to command a level of stator current (75 amps) for the motor 11 that will maintain normal saturated rotor flux. The flux profiling sequencer will remain in FLUX PROFILE STATE 3 until power to the motor 11 is interrupted during the power down routine represented by process block 88 in FIG. 7. The flux profiling sequencer will then be reset to FLUX PROFILE STATE 0.

This completes a description of one example of the invention. Of course, those skilled in the art will understand that many of the details provided herein may be modified while still carrying out the invention, and therefore, to apprise the public of the scope of the invention, the following claims are made.

I claim:

1. In a vector control apparatus for controlling flux-producing current and torque-producing current, a method of supplying flux-producing current to windings of a stator in an AC motor to improve buildup of steady-state operating flux in a rotor of the motor, where initially flux is not established in the rotor, the method comprising:

supplying current to the windings of the stator through an inverter which includes a plurality of semiconductor switches;

commanding flux-producing current to a high level than a level required to maintain steady-state operating flux in the rotor;

operating the semiconductor switches in the inverter in response to the commanding of the flux-producing current to supply an initial flux-producing current to the windings of the stator up to the maximum current rated for pulsed operation of the semiconductor switches, wherein the initial current is greater than the steady-state flux-producing current for maintaining normal saturated flux in the rotor;

maintaining the initial current for a time interval over which the product of initial current and time is sufficient to produce a steady-state operating flux in the rotor; and after such interval, operating the semiconductor switches in the inverter to reduce current supplied to the windings of the stator to a current for maintaining steady-state operating flux in the rotor.

2. The method of claim 1, further comprising:
resolving the current supplied to the plurality of semiconductor switches into a flux-producing component and a torque-producing component; and
commanding the torque-producing component to zero during the time interval in which flux in the rotor is brought up to the steady-state operating flux.

3. The method of claim 2, further comprising:
calculating a phase angle of the current to be supplied to the plurality of semiconductor switches based on a slip angle for operation of the AC motor; and
commanding the slip angle to zero during the time interval in which flux in the rotor is brought up to the steady-state operating flux in the rotor.

4. The method of claim 1, further comprising:
calculating a phase angle of the current to be supplied to the plurality of semiconductor switches based on a slip angle for operation of the AC motor; and
commanding the slip angle to zero during the time interval in which flux in the rotor is brought up to the steady-state operating flux in the rotor.

5. The method of claim 4, further comprising:
resolving the current supplied to the plurality of semiconductor switches into a flux-producing component and a torque-producing component; and
commanding the torque-producing component to zero during the time interval in which flux in the rotor is brought up to the steady-state operating flux.

6. In a vector control apparatus for controlling flux-producing current and torque-producing current, a method of controlling flux-producing current supplied to windings of a stator in an AC motor, where initially flux is not established in a rotor in the AC motor, to inhibit production of transient torques on a motor output shaft driven through the rotor, the method comprising:

supplying current to the windings of the stator through an inverter which includes a plurality of semiconductor switches;

commanding the flux-producing current to establish operating flux in the rotor up to approximately 10% of a steady-state operating flux in the rotor;

operating the semiconductor switches in the inverter in response to the commanding of the flux-producing current to supply a plurality of gradually increasing currents to the windings of the stator over a time interval corresponding to approximately one rotor time constant to bring flux in the rotor up to approximately 10% of a steady-state operating flux in the rotor; and after the interval corresponding to approximately one rotor time constant, commanding increased flux-producing current and operating the semiconductor switches in the inverter to increase the current supplied to the windings of the stator for establishing and maintaining the steady-state operating flux in the rotor.

7. In a vector control apparatus for controlling flux-producing current and torque-producing current, a method of controlling current supplied to windings of a stator in an AC motor to improve buildup of steady-state operating flux in a rotor of the AC motor, where initially flux is not established in the rotor, and while inhibiting production of transient torques on a motor output shaft driven through the rotor, the method comprising:

supplying current to the windings of the stator through an inverter which includes a plurality of semiconductor switches;

commanding the flux-producing current to establish operating flux in the rotor up to approximately 10% of a steady-state operating flux in the rotor;

operating the semiconductor switches in the inverter in response to the commanding of the flux-producing current to supply a plurality of gradually increasing currents to the windings of the stator over a time interval corresponding to approximately one rotor time constant to bring flux in the rotor up to approximately 10% of a steady-state operating flux in the rotor;

after the time interval corresponding to approximately one rotor time constant, commanding the flux-producing current to a higher level than a level required to maintain steady-state operating flux in the rotor;

operating the semiconductor switches in the inverter in response to the commanding of the flux-producing current to the higher level to supply a flux-producing current to the windings of the stator up to the maximum current rated for pulsed operation of the semiconductor switches, wherein the current to the windings of the stator includes flux-producing current that is greater than the steady-state flux-producing current for maintaining normal saturated flux in the rotor;

maintaining the maximum current for a time interval over which the product of current and time is sufficient to produce a steady-state operating flux in the rotor; and after such interval, operating the semiconductor switches in the inverter to reduce current supplied to the windings of the stator to a current for maintaining steady-state operating flux in the rotor.

8. In a vector control apparatus for controlling flux-producing and torque-producing current supplied to windings of a stator in an AC motor to improve buildup of steady-state operating flux in a rotor of the motor, where initially flux is not established in the rotor, the apparatus comprising:

means for providing power to a DC bus;

drive means coupled to the DC bus and including an inverter with a plurality of semiconductor switches for supplying current to the windings of the stator;

control means coupled to the drive means for controlling the semiconductor switches to supply an initial current to the windings of the stator up to the maximum current rated for pulsed operation of the semiconductor switches, wherein the initial current is greater than the steady-state flux-producing current for maintaining normal saturated flux in the rotor;

wherein said control means further controls the semiconductor switches in the inverter to maintain the initial current for a time interval over which the product of current and time is sufficient to produce a steady-state operating flux in the rotor; and wherein after such time interval, said control means is operable for reducing the initial current supplied to the windings of the stator to a current for maintaining a steady-state operating flux in the rotor.

9. The apparatus of claim 8, wherein
said control means includes means for resolving the current to be supplied through the semiconductor switches into a flux-producing component and a torque-producing component; and wherein said control means includes means for commanding the torque-producing component to zero during the time interval in which flux in the rotor is brought up to the steady-state operating flux.

10. The apparatus of claim 9, wherein
said control means includes means for calculating a phase angle of the current to be supplied to the plurality of semiconductor switches based on a slip angle for operation of the AC motor; and wherein said control means includes means for commanding the slip angle to zero during the time interval in which flux in the rotor is brought up to the steady-state operating flux.

11. The apparatus of claim 8, wherein
said control means includes means for calculating a phase angle of the current to be supplied to the plurality of semiconductor switches based on a slip angle for operation of the AC motor; and wherein said control means includes means for commanding the slip angle to zero during the time interval in which flux in the rotor is brought up to the steady-state operating flux.

12. The apparatus of claim 11, wherein
said control means includes means for resolving the current supplied to the plurality of semiconductor switches into a flux-producing component and a torque-producing component; and wherein said control means includes means for commanding the torque-producing component to zero during the time interval in which flux in the rotor is brought up to the steady-state operating flux.

13. In a vector control apparatus for controlling flux-producing current and torque-producing current supplied to windings of a stator in an AC motor, where initially flux is not established in a rotor in the AC motor, to inhibit production of transient torques on a motor output shaft driven through the rotor, the apparatus comprising:

means for providing power to a DC bus;

drive means coupled to the DC bus and including an inverter with a plurality of semiconductor switches for supplying current to the windings of the stator;

means for commanding the flux-producing current to a higher level than a level required to maintain steady-state operating flux in the rotor;

means responsive to the means for commanding and coupled to the drive means for controlling the semiconductor switches in the inverter to supply a plurality of gradually increasing currents to the windings of the stator over a time interval corresponding to approximately one rotor time constant to bring flux in the rotor up to approximately 10% of a steady-state operating flux in the rotor; and after the time interval corresponding to approximately one rotor time constant, said means for controlling controls the semiconductor switches in the inverter to increase the current supplied to the windings of the stator to a current for establishing and maintaining the steady-state operating flux.

14. In a vector control apparatus for controlling flux-producing current and torque-producing current supplied to windings of a stator in an AC motor to improve buildup of staedy-state operating flux in a rotor of the AC motor, where initially flux is not established in the rotor, and while inhibiting production of transient torques on a motor output shaft driven through the rotor, the apparatus comprising:

means for providing power to a DC bus;

drive means coupled to the DC bus and including an inverter with a plurality of semiconductor switches for supplying current to the windings of the stator;

means for commanding the flux-producing current to establish operating flux in the rotor up to approximately 10% of a steady-state operating flux in the rotor;

means responsive to the means for commanding and coupled to the drive means for controlling the semiconductor switches in the inverter to supply a plurality of gradually increasing currents to the windings of the stator over a time interval corresponding to approximately one rotor time constant to bring flux in the rotor up to approximately 10% of a steady-state operating flux in the rotor;

means for commanding the flux-producing current to a higher level than a level required to maintain steady-state operating flux in the rotor;

means responsive after a time interval corresponding to approximately one rotor time constant for commanding the flux-producing current to a higher level than a lever required to maintain steady-state operating flux in the rotor;

wherein, said control means is responsive to the means for commanding current to a higher level for controlling said semiconductor switches in the inverter to conduct a higher level current up to the maximum current rated for pulsed operation of the semiconductor switches for a time interval over which a product of current and time is sufficient to produce a steady-state operating flux in the rotor, wherein the the higher level current is greater than the steady-state flux-producing current for maintaining normal saturated flux in the rotor; and wherein after the last-mentioned time interval, said control means is operable for controlling the semiconductor switches in the inverter to reduce the current supplied to the windings of the stator to a current for maintaining the steady-state operating flux in the rotor.

* * * * *

UNITED STATES PATENT AND TRADEMARK OFFICE
CERTIFICATE OF CORRECTION

PATENT NO. : 4,845,418
DATED : July 4, 1989
INVENTOR(S) : Craig R. Conner

It is certified that error appears in the above—identified patent and that said Letters Patent is hereby corrected as shown below:

| | |
|---|---|
| Column 1, line 67 | "sole" should be --solve--. |
| Column 2, line 18 | Delete "This technique is enhanced" |
| Column 2, line 18 | "in" should be --In--. |
| Column 5, line 5 | Add "T" before the equation. |
| Column 7, line 35 | Add "-" in --fault-indicating--. |
| Column 10, line 2 | "winding" should be --windings--. |
| Column 10, line 24 | Add "the" before drawings. |
| Column 15, line 42 | "high" should be --higher--. |

UNITED STATES PATENT AND TRADEMARK OFFICE
CERTIFICATE OF CORRECTION

PATENT NO. : 4,845,418

DATED : July 4, 1989

INVENTOR(S) : Craig R. Conner

It is certified that error appears in the above-identified patent and that said Letters Patent is hereby corrected as shown below:

Column 18, line 63    "Staedy" should be --steady--.

Signed and Sealed this

Third Day of July, 1990

*Attest:*

HARRY F. MANBECK, JR.

*Attesting Officer*    Commissioner of Patents and Trademarks